Nov. 26, 1940.	M. HEIDELMEYER	2,222,745
APPARATUS FOR EMPTYING CHOCOLATE MOLDS OR THE LIKE
Filed Aug. 1, 1939
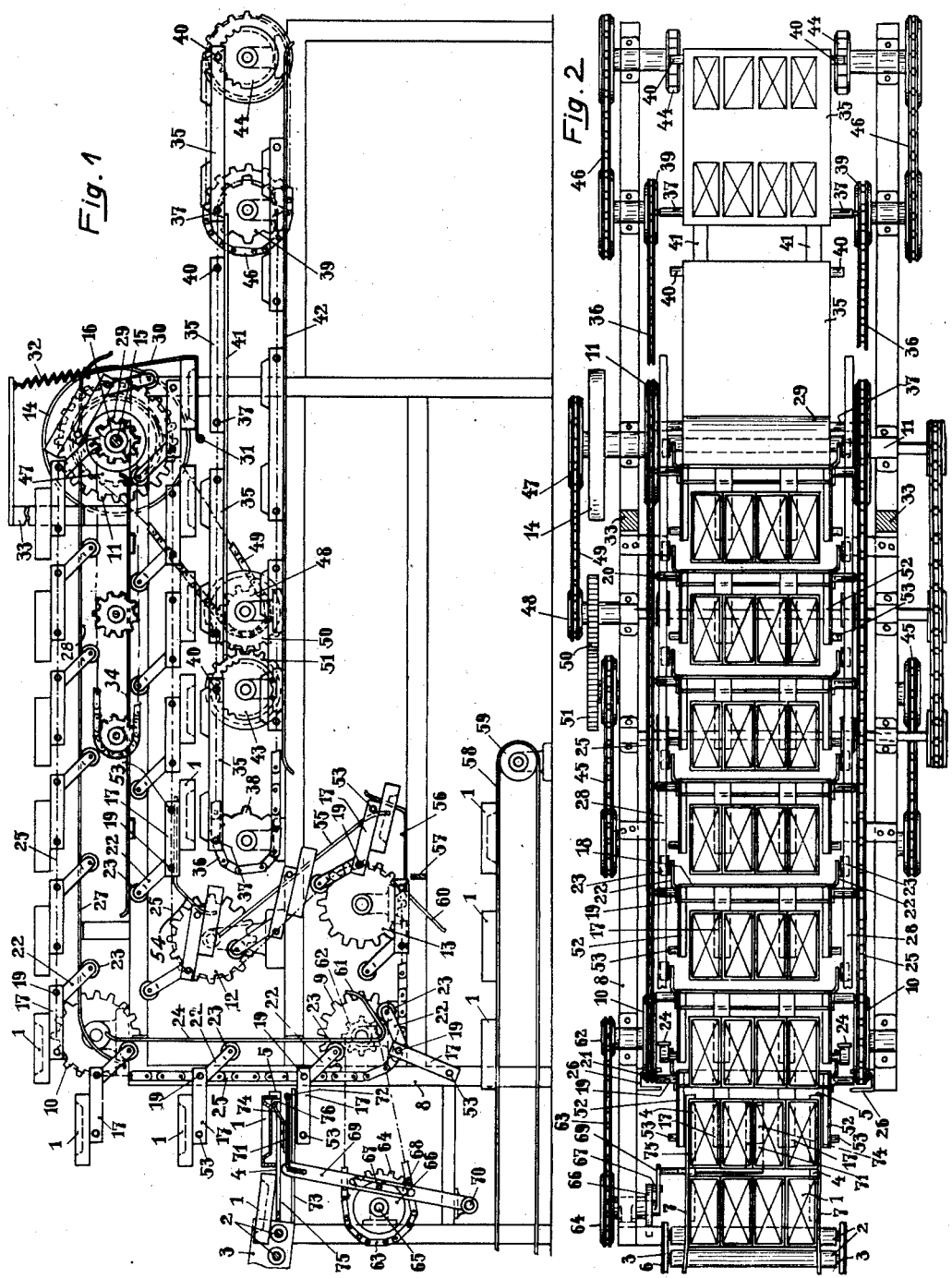
Inventor:
M. Heidelmeyer
By E. F. Wenderoth atty Patented Nov. 26, 1940

2,222,745

UNITED STATES PATENT OFFICE 2,222,745

APPARATUS FOR EMPTYING CHOCOLATE MOLDS OR THE LIKE

Max Heidelmeyer, Niedersedlitz, Germany

Application August 1, 1939, Serial No. 287,834
In Germany August 5, 1938

3 Claims. (Cl. 214—1.1)

This invention relates to apparatus for emptying chocolate molds or the like.

The molds filled with chocolate mass or the like are subjected to a cooling operation, being conveyed on a continuous track through a correspondingly arranged cooling apparatus.

The invention is concerned with the problem of gripping mechanically th molds coming from the cooling apparatus or the like, leading them to a turning station, turning them over and depositing them after emptying the molds.

For the solution of this problem the invention makes use of an endless conveyor, for example conveyor chains, on which are rotatably mounted magnet bodies, which grip metal or metal-lined molds advanced to a stop. The magnet bodies have controlling extensions and controlling rails are associated with the conveyor chains on which the extensions run in such manner that the molds on being seized and conveyed to the reversing station assume a substantially horizontal position. At the reversing station means are provided in known manner which in the molds being turned prevent their contents from falling out of the molds. After the turning operation the magnet bodies, which hold the molds as before, are again so controlled by means of their extensions and guide rails that the turned mold again lies approximately horizontal and the chocolate bodies (tablets, pralines or the like) fall out of them and can be taken up by supporting plates, these supporting plates being moved during the emptying operation in the same direction and with the same speed as the molds at a suitable distance beneath them. The magnet bodies then take the molds with them to a station, where by means of a stop the molds are stripped from the magnet bodies which in endless circulation of the conveyor chains or the like carrying them return to the station where they again take up a mold coming from the cooling apparatus.

The use of the metallic bodies serving as grippers is particularly advantageous, because the usual countless molds can be used without alteration, since the magnet bodies formed for example as bars and bearing on the undersides of the molds do not require the molds to be formed with wider edges or other means with which jaw-shaped or similarly shaped grippers must engage. Even when the molds are formed from artificial resin or like material, they need only be provided at the part in question, for example at the bottom with a metal lining (which can be inserted in making the mold) in order to make them suitable for use with the new apparatus without departure from the usual shape.

The grippers formed as magnet bodies render it possible, by an extension rigidly connected thereto, to ensure the horizontal position of the molds to the turning station and after turning to ensure again the horizontal position, suited for emptying the molds. For this purpose guide rails on which the extensions run need be associated with the guide track only at the stations in question.

In any case the magnet bodies pass through the whole apparatus in a continuous path, so that the conveyor can be moved continuously at uniform speed, which is necessary for a rapid delivery, i. e. for a correspondingly great output suited to the working capacity of the cooling apparatus, quite apart from the fact that intermittently moved conveyor chains with grippers take too much power and wear out much too rapidly.

The apparatus permits of jolting the guide rails for the extensions of the magnet bodies, when the molds are turned and also of jolting the turned molds, so that the emptying operation proceeds smoothly.

The release of the molds held by the magnet bodies is effected simply, since the magnet bodies with the molds adhering thereto need only be led past a stripper which draws off the molds and delivers them to a conveyor belt, which returns these molds to the station where filling again takes place.

In the accompanying drawing one embodiment of the new apparatus is illustrated:

Fig. 1 being a side view and Fig. 2 a plan.

The filled molds—the embodiment deals with molds 1, which each contain four chocolate tablets—pass to a track 3 suitably inclined and fitted in known manner with rollers 2 from the cooling apparatus and finally pass to the angle irons 4 arranged at both sides of the track forming a continuation of the roller track, which angle irons are provided at their free ends with upturned portions 5 which act as stops.

The roller track with its lateral cheeks 6 is so dimensioned that these cheeks are at a distance apart which corresponds to the greatest width of mold; however shiftable cheeks 7 are inserted in the track, which extend to the outlet end of the track, reducing the intermediate space, and with which the guide rails 4 are combined, so that at the end of the track the molds meet a guide corresponding to their width. The means for shifting the intermediate cheeks 7 are not shown in the drawing and may be any suitable means.

The molds coming onto the roller track are held in a quite definite position by the stops 5 and held here ready for the mechanical feeding.

The frame 6 of the new apparatus carries a number of guide rollers 9, 10, 11, 12 and 13, which are formed as sprocket wheels. As is evident from Fig. 2, two such sprocket wheels are always provided at the same level opposite one another, so that they carry two chains extending parallel to one another.

The drive is effected from the belt pulley 14, on the shaft 15 on which are mounted the two sprocket wheels 11. The sprocket wheels are carried by the bearing brackets 16.

The two endless conveyor chains continuously moved in the same direction and with the same speed carry at regular distances apart the magnet bodies 17, two magnet bodies formed as bars being secured to a cross bar 18. This cross bar has lateral brackets 19, into the longitudinal bores of which project pivots 20, which are arranged on the chain members 21. The magnet bodies with their support 18 can turn about these pivots. The supports 18 have in addition on each side an inclined extension 22, which is connected rigidly with the support and at its free end carries a loose rotatable roller 23.

In order to straighten the magnet bodies, which the chain wheels 9 have passed, so that they assume a horizontal or approximately horizontal position, the vertically disposed guide rails 24 are provided on which the rollers 23 bear due to the weight of the magnet bodies, which would make a corresponding swinging movement. Accordingly the magnets are held positively in the horizontal position in the movement from the sprocket wheel 9 to the sprocket wheeel 10 lying above it. In order that the chain 25 will not come off, U-shaped vertically disposed guides 26 are provided between the sprockets 9 and 10, in which the chain members are vertically guided.

The bar shaped magnet bodies 17 on the upward movement of the chain engage beneath the foremost metallic mold held by the stops 5 in the ready for use position, which mold is held by magnetic action to the magnet bodies.

In the region of the upper sprocket 10 curved guide rails 27 are provided, the lower sides of which are engaged by the rollers 23 on the extensions 22 and on passage of the chains over the sprockets 10 ensure that the magnet bars 17 maintain their horizontal position, i. e. retain the molds carried thereby in the horizontal position.

The guide 27 continues horizontally as the part 28, so that also in the continued passage of the horizontal chain track the magnet bars are held in the horizontal position with the molds carried thereby, until they reach the point of reversal at the sprocket 11. The sprockets 11 are provided with a supporting drum 29, on the periphery of which the magnet bodies 17 bear with their reverse sides. These drums may consist of non-magnetic material such as brass, artificial resin, hard-wood or the like. These drums ensure that the magnet bodies are straightened with the molds and then turned. In order to avoid premature emptying of the molds, a band 30 of linen fabric or the like is provided, the lower end of which is secured at 31 beneath the sprocket 11 at a suitable distance therefrom and to the other end of which springs 32 are connected, which are carried by the part 33 of the frame. These springs tend to pull the band, made according to the width of the molds, continuously towards the sprockets. Consequently, the band on the springs 32 being stretched lies on the molds and covers them and safely holds the contents of the molds within them. Damage of the mold contents is thus prevented.

When the mold in question is finally turned, as one mold is shown in Fig. 1, the chains now running horizontally pull this mold from the band past the point 31, so that the contents of the molds with the open side turned downwards can be discharged. The extensions 22 or their rollers 23 are brought into engagement with horizontally disposed guide rails 34, so that also here the molds in overturned position remain horizontal during the further feeding and discharge.

The rails 34 are formed as a jolting device as shown and any known kind of jolting device can be used. For example the rails 34 can be resiliently suspended and moved up and down in jerks, i. e. can be jolted by cam discs acting thereon.

At a suitable distance under the overturned molds extends an endless conveyor belt, which is formed in known manner with two chains with plates carried thereby. The plates 35 are secured to the chains 36 at their forward end at 37 and the chains pass over the sprocket wheels 38 and 39. At their rear ends the plates 35 are provided with pins 40 and with these pins they run on guide rails 41 and 42. On leaving the guides the pins 40 come into engagement with an auxiliary wheel 43 or 44, which is provided with corresponding pockets on its periphery, in which the pins engage and ensure that on reversal of the chains the plates 35 continuously keep their horizontal position. The supporting wheels 43 and 44 are driven by auxiliary chains 45 and 46. The whole of the drive is taken from the belt pulley 14 by means of the sprocket wheels 47, 48 and the chain 49 led thereover, and the gearing 50, 51 ensuring that the direction of feed of the chain 36 will coincide with the direction of feed of the chain 25 which carries the magnet bodies.

In the embodiment shown, the plates 35 are of such length that they grip each two turned molds and accordingly the contents of two molds can be discharged on to each plate 35. The chocolate bodies deposited on the plates 35 are first carried to the left in the direction of Fig. 1, then the plates move downwards and are moved to the right, then they pass to the right hand turning point again upwards and pass into the right hand position seen in Fig. 2, where the chocolate tablets can be removed by hand; or mechanical removing devices provided with strippers or the like can be provided.

The emptied molds are then fed downwards with their magnet bodies over the sprocket wheels 12. On the supporting bars 18 are provided laterally of the molds brackets 52 with supporting pins 53. With these supporting pins the magnet bodies first rest on the guide rails 54 and then finally on guide rails 55 inclining downwards and finally on further associated guide rails 56, which are provided in the region of the lower sprockets 13.

By the guide rails 56 the magnet bodies and also the molds carried thereby are again straightened, so that the chain extending horizontally between the sprockets 13 and 9 moves with it the magnet rails 17 with the molds in horizontal position. In the path of the molds carried by the magnet bodies 17 is provided a projection 57 in the form of a vertically extending bar arranged between the guide rails 56. With this projection contacts the end of the mold carrying the magnet body, and this mold is held fast by the projection, i. e. is stripped off on the further movement of the magnet body. It falls on an endless conveyor band 58, which runs over the roller 59, and is fed on this conveyor band for example to the position where the mold is filled again.

The guide rails 56 terminate in a downwardly inclined part 60 on which the pins 53 slide and from which they finally slide so that on the arrival at the sprocket wheel 9 the freed magnet bodies with their extensions 22 or their rollers 23 can again engage with the vertical guide rails 24 or their lower bent ends 61.

The operations now commence again.

In order to ensure that the molds 1 coming on the roller track 3 will pass to the stop 5, the following arrangement is provided.

On the shaft of the guide roller 9 is arranged a sprocket wheel 62, over which the chain 63 is led, which drives by means of the sprocket wheel 64 a shaft 65 mounted on the frame 8. On this shaft is secured a crank disc pulley 66 with a pin 67. The pin 67, which projects from the side of the crank disc 66 mounted on the end of the shaft 65, engages in a slot 68 of a control lever 69. The control lever rotatable about the pivot 70 is thus moved to and fro thereon. The free end of this control lever carries a plunger 71, which runs with a roller 72 on guide rails 73. On the forward end of the plunger is provided a spring 74.

In the region of the lateral guide rails 4 for the molds 1 are mounted magnet bodies 75 in such manner that the metallic mold coming from the roller track 3 is held to this magnet body.

The backwardly moving lever 69 now leads the spring 74 into the path of the forward end of the mold 1 secured by the magnet body. The spring is first pressed downwards, then snaps with its overturned end 76 behind the frame of the mold. In the succeeding swinging of the control lever 69 the mold is drawn from the magnet body and brought forwards, so that it bears against the stop 5 of the guide rails 4, i. e. in the correct position, in which the magnet rails 17 can take with them the mold.

The oscillation of the control lever 69 is so effected by the drive of the shaft 65, that a mold is brought each time into the ready position between two magnet bodies.

I claim:

1. Apparatus for emptying chocolate molds or the like coming from a cooling apparatus including an endless conveyor, said conveyor presenting a receiving station for the molds, a turning station for reversing the molds, magnet bodies mounted to pivot on said conveyor for seizing molds fed from the cooling apparatus to the receiving station, extensions secured to said magnet bodies, guide means disposed adjacent the flights of said endless conveyor for co-operation with said guide means to control the magnet bodies, said guide means so controlling the magnet bodies that the molds gripped thereby are fed in the horizontal position to the turning station and after being inverted to empty the molds are again held in the horizontal position and stripping means for stripping the molds when emptied from the magnet bodies.

2. Apparatus for emptying chocolate molds or the like coming from a cooling apparatus including an endless conveyor, said conveyor presenting a receiving station for the molds, a turning station for reversing the molds, magnet bodies mounted to pivot on said conveyor for seizing molds fed from the cooling apparatus to the receiving station, extensions secured to said magnet bodies, guide means disposed adjacent the flights of said endless conveyor for co-operation with said guide means to control the magnet bodies, a portion of said guide means arranged as a jolting means to empty the molds, said guide means so controlling the magnet bodies that the molds gripped thereby are fed in the horizontal position to the turning station and after being inverted to empty the molds are again held in the horizontal position and stripping means for stripping the molds when emptied from the magnet bodies.

3. Apparatus for emptying chocolate molds or the like coming from a cooling apparatus including an endless conveyor, said conveyor presenting a receiving station for the molds, a turning station for reversing the molds, magnet bodies mounted to pivot on said conveyor for seizing molds fed from the cooling apparatus to the receiving station, extensions secured to said magnet bodies, guide means disposed adjacent the flights of said endless conveyor for co-operation with said guide means to control the magnet bodies, a portion of said guide means arranged as a jolting means to empty the molds, and another portion of said guide means disposed in front of the receiving station in the direction of travel of the conveyor engaging and straightening the magnet bodies and leading them to mold stripping means, said guide means so controlling the magnet bodies that the molds gripped thereby are fed in the horizontal position to the turning station and after being inverted to empty the molds are again held in the horizontal position and stripping means for stripping the molds when emptied from the magnet bodies.

MAX HEIDELMEYER.